United States Patent [19]

Hanson et al.

[11] 4,366,834

[45] Jan. 4, 1983

[54] BACK-FLOW PREVENTION VALVE

[75] Inventors: David E. Hanson, Hoffman Estates; Martin E. Frenkel, Round Lake Beach, both of Ill.

[73] Assignee: Sargent-Welch Scientific Company, Skokie, Ill.

[21] Appl. No.: 195,874

[22] Filed: Oct. 10, 1980

[51] Int. Cl.³ ............................................. F16K 31/122
[52] U.S. Cl. .................... 137/489.3; 137/565; 251/28; 251/33; 417/295; 417/306
[58] Field of Search ............... 137/565, 489.3; 251/28, 251/29, 38, 44, 33; 417/279, 289, 295, 306, 505, 507

[56] References Cited

U.S. PATENT DOCUMENTS

| 1,684,987 | 9/1928 | Hazard | 137/514.5 |
| 2,362,750 | 11/1944 | Hayward | 417/505 X |
| 2,594,132 | 4/1952 | Dalrymple | 251/28 |

FOREIGN PATENT DOCUMENTS 76256  4/1918 Austria ................................ 417/295

OTHER PUBLICATIONS

Leybold-Heraeus G.M.B.H. & Co., "Operating Instructions" for Trivac® Pumps, S30A, S60A, D30A, D60A, Cat. No. 10497, 10510, 11075, 11100, 2 pp.

Primary Examiner—Alan Cohan
Attorney, Agent, or Firm—Lockwood, Dewey, Alex & Cummings

[57] ABSTRACT

A back-flow prevention valve assembly is disclosed for use with a vacuum pump or the like and employs a valve element movable between positions opening or closing a passageway through the assembly. In the event of pump failure, a control valve, which is operated by fluid from the pressure side of the pump, vents ambient air behind the valve element to assist it in moving rapidly to the closed position to prevent backflow. After resumption of pumping, a controlled withdrawal of ambient air behind the valve element delays opening of the valve until the pump has created a sufficient vacuum to minimize influx of air upstream when the valve opens.

27 Claims, 5 Drawing Figures

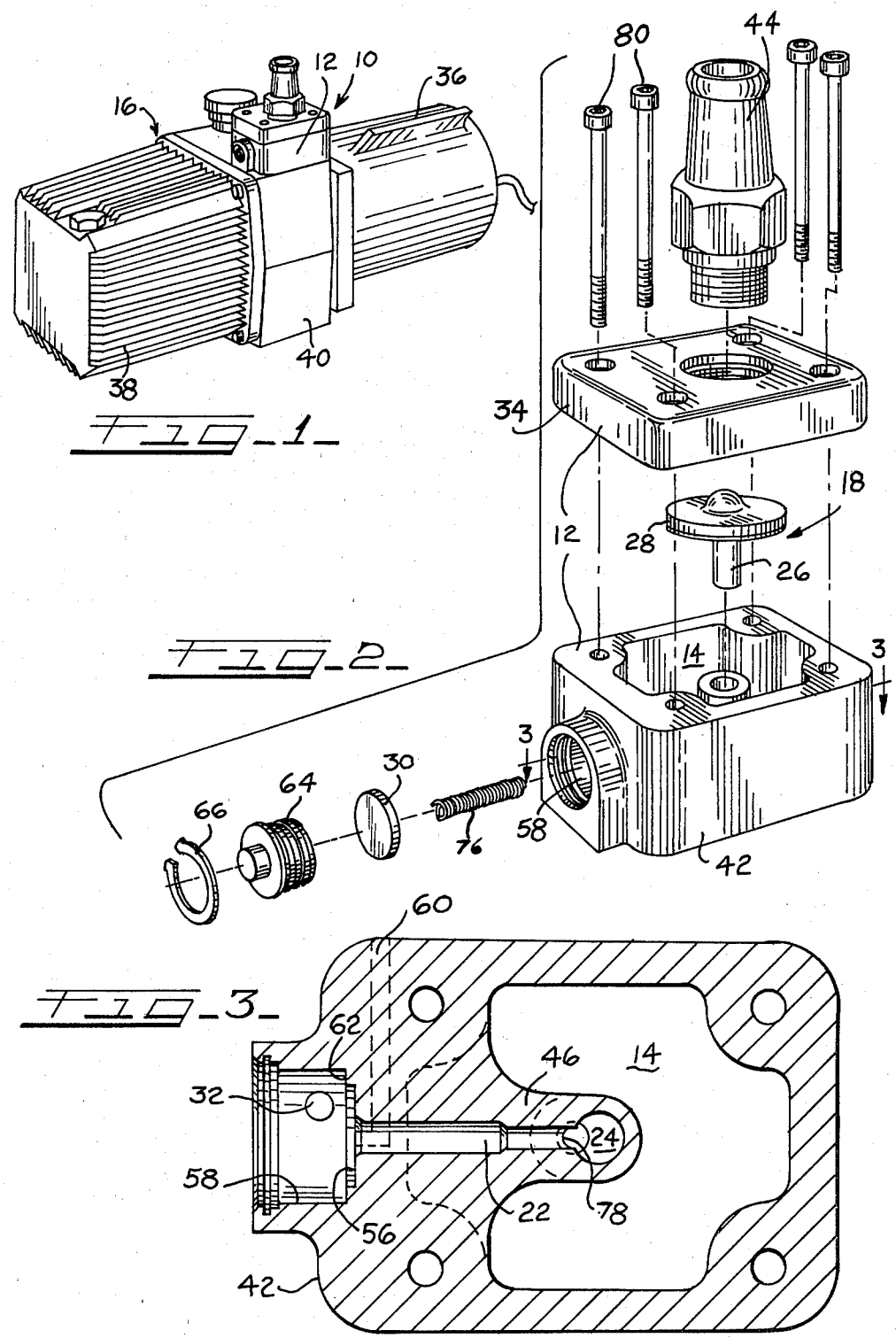

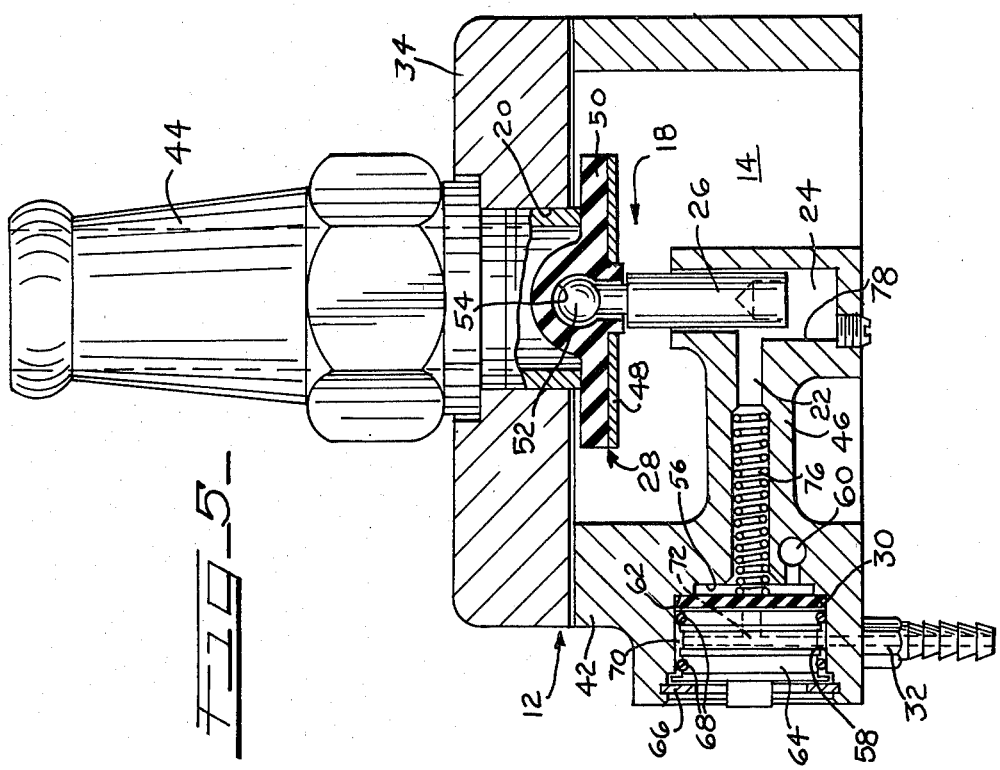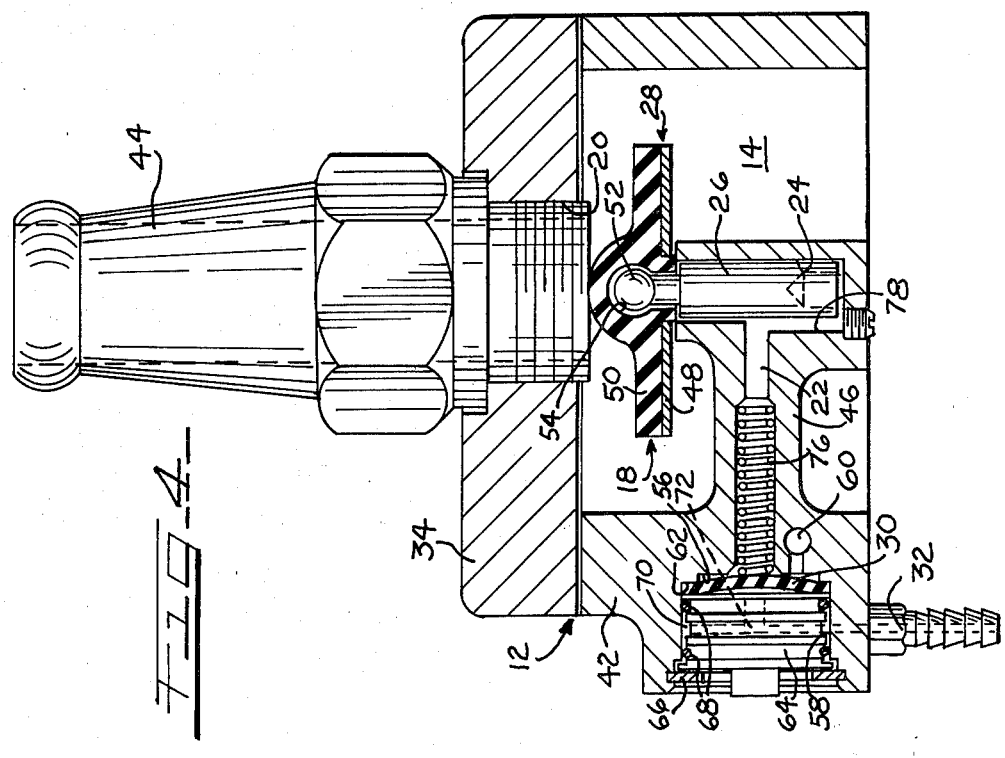

BACK-FLOW PREVENTION VALVE

The present invention generally relates to back-flow prevention valves for permitting the flow of fluid in one direction only. More particularly, the present invention relates to improved back-flow prevention valves adapted for use with vacuum pumps to minimize back-flow into an evacuated system or the like in the event of pump failure.

Vacuum pumps are used in a wide variety of industrial, manufacturing and laboratory processes and applications. In many of these applications, the maintenance of a vacuum is crucial to completion of the process, experiment or the like. For example, some industrial plating, coating and electrodepositing processes are carried out in an evacuated chamber. In such situations, the loss of vacuum in the chamber can result in substantial losses of time and material by reason of contamination from the entry of ambient air. Accordingly, back-flow prevention valves are often employed between the system which is being evacuated and the vacuum pump, so that contaminants are not permitted to flow back into the system in the event of pump failure, which may occur because of power loss or actual mechanical failure. Typically, these back-flow prevention valves employ a valve element which is movable to block the flow passageway from the system being evacuated, thereby preventing air or other contaminants from leaking back into the evacuated system.

One of the drawbacks with some of the prior art back-flow prevention valves is that the valve element does not move quickly enough to block the flow of ambient air or gas into the evacuated system. In those industrial and laboratory applications where even a small level of contamination is critical, this delay may permit too much back-flow into the system.

Another shortcoming of some back-flow valves arises when the vacuum pump starts up after an interruption. In this situation, the valve element will sometimes open before the vacuum pump has drawn a vacuum equal to that in the system, thereby permitting a brief influx of ambient air or other gas into the system. Or, with other back-flow prevention valves, when a pump interruption occurs because of mechanical failure in the pump, the system must be opened to the ambient atmosphere during repair or replacement of the pump. Of course, for those processes described above, this results in a waste of the material and labor invested in the particular process or operation.

Accordingly, it is a general object of the present invention to provide a back-flow prevention valve which does not suffer from the drawbacks described above.

It is a further object of the present invention to provide a back-flow prevention valve which, upon re-starting of the vacuum pump, opens only after a substantial vacuum has been created by the pump.

These and other objects of the present invention are set forth in the following detailed description of the preferred embodiment of the present invention shown in the attached drawings, of which:

FIG. 1 is a perspective view of a vacuum pump employing a back-flow prevention valve assembly embodying the present invention.

FIG. 2 is an exploded view of the back-flow prevention valve assembly illustrated in FIG. 1 and embodying the present invention.

FIG. 3 is a horizontal cross sectional view taken along line 3—3 of FIG. 2.

FIG. 4 is a vertical cross sectional view of the back-flow prevention valve assembly embodying the present invention, illustrating the valve assembly in the open position so as to permit a flow of gas or other fluid therethrough.

FIG. 5 is a vertical cross sectional view of the back-flow prevention valve assembly of the present invention in the closed position so as to prevent influx of ambient air or contaminants into the system being evacuated.

Referring to the drawings, which show the present invention in its preferred embodiment for the purpose of illustration and not limitation, this invention is generally embodied in a back-flow prevention valve assembly 10 having a rigid housing 12 with a flow passageway 14 therethrough adapted to communicate between an upstream system or fluid source, such as system to be evacuated (not shown), and a vacuum pump 16. To prevent back-flow, valve means 18 in the housing 12 is movable between an open position (FIG. 4) spaced from the inlet orifice 20 to the fluid flow passageway 14, and a closed position (FIG. 5) blocking the flow of fluid at the inlet orifice.

In accordance with the present invention, in the event of pump failure, back-flow is minimized by forcing the valve means 18 quickly into the closed position. This is achieved by venting ambient air, which is at a higher pressure than the air being evacuated, through an air passageway 22 and into a chamber 24 behind the valve means 18. The higher pressure air forces piston or plunger 26, which is slidably received therein, upwardly causing the sealing element 28 of the valve means to block orifice 20 against back-flow into the system being evacuated.

The flow of ambient air into the chamber 24 is controlled by a diaphragm valve 30. During operation of the pump, high pressure hydraulic fluid or gas communicates through pressure port 32 to hold the normally open diaphragm in a closed position, sealing the ambient air passageway 22. When the pump ceases to operate, for whatever reasons, the spring loaded diaphragm opens, permitting air to vent into the passageway 22 and forcing the valve means 18 to a closed position as described above. If, because of mechanical failure or the like the pump needs replacing, the entire valve assembly, or simply the housing top plate 34, with the valve means 18 held in place by suction, can be removed from the pump 16 without breaking the vacuum.

In accordance with another aspect of the present invention, when the pump resumes operation after an interruption, the valve means 18 does not immediately move to the open position. The higher pressure ambient air remaining in the passageway 22 and chamber 24 holds the valve means in a closed position, until sufficient air bleeds through the clearance between the piston or plunger 26 and the walls of the chamber 24 so as to allow the valve means to drop to an open position. This gives the vacuum pump sufficient time to develop a relatively high vacuum, which reduces the momentary influx of contaminants into the system when the valve means 18 opens.

Turning now to a more detailed description of the preferred embodiment of the present invention, as shown in the attached drawings, FIG. 1 depicts the valve assembly 10 of the present invention mounted atop a vacuum pump 16, of the type having an electric motor 36 in a direct drive relationship with rotary pumping elements (not shown) submerged in an oil bath within housing 38. The assembly 10 is mounted on pump support plate 40, so that the gate flow passageway 14 in the valve assembly communicates directly with the inlet to the pumping chambers. The pump 16 itself may be of any type commonly used, e.g., a rotary vane pump, and the details of pump construction are not shown or discussed in detail herein.

The valve assembly housing 12 is of generally two-part construction, with a substantially hollow body portion 42 which defines the interior flow passageway 14, and is closed at the top by the top plate 34. In the illustrated embodiment, the underside of the valve body 42 is connected directly over the inlet to the vacuum pump 16 so as to communicate directly therewith. Gas from the system being evacuated enters the valve assembly 10 through the inlet orifice 20 in the top plate 34, which is shown threadedly receiving a connector 44 with a tapered outer end for insertion into rubber tubing or the like. For quick closure of the orifice to prevent back-flow in the event of pump failure, an internal lateral support arm 46 extending from one wall of the body portion 42 supports the valve means 18 directly below the orifice 20.

The valve means 18 is made up of the sealing element 28 and the piston or plunger 26, which is slidably received within the chamber 24 in the end of the support arm 46. The sealing element 28 is generally disc-shaped, and includes a flat support plate 48 of aluminum or other rigid material, covered with a layer of elastomeric or rubber-like material 50 such as neoprene, polyurethane or the like so as to provide a tight seal against the orifice 20. The sealing element 28 is attached to the piston or plunger 26 by a ball and socket joint wherein ball joint 52 at the upper end of the piston or plunger is received through a center opening in the support plate 48 and into a socket 54 molded in the elastomeric material 50. This arrangement provides a small amount of play or wobble in the sealing element 28, which permits a good sealing against the orifice 20 even in the event of slight manufacturing or dimensional variations. The plunger or piston 26 is preferably cylindrical, and chamber 24 is of like shape and is sized to permit slidably movement of the plunger up and down within the chamber.

As described briefly above, air pressure is employed in the present invention to aid in forcing the plunger 26 and sealing element 28 quickly upwardly to seal the orifice 20 against back-flow in the event of pump failure. The flow of ambient air between the air passageway 22, which leads to the chamber 24, and ambient air vent port 60 in the base portion 42 is controlled by the diaphragm valve 30, which is mounted in a large recess 58 in the body portion 42 of the housing. As best seen in FIGS. 3, 4 and 5, the air passageway 22 extends from the chamber 24, through the support arm 46, and through the center of the bottom surface 56 of the recess 58. The air vent port 60 also communicates through the bottom surface 56. The diaphragm valve 30 is mounted within the recess 58, with its peripheral edge resting on shoulder 62 which extends around the bottom inside edge of the recess, and supports the diaphragm above the bottom surface 56 of the recess. In this position, ambient air can communicate directly from the vent port 60 to the air passageway 22 through the space between the diaphragm 30 and the bottom surface 56 of the recess 58.

The peripheral edge of the diaphragm 30 is compressively held in place against the shoulder 62 by a generally cylindrical insert 64 positioned within the recess 58 and locked in place by a snap ring 66. The insert 64 is of slightly smaller diameter than the recess and is sealed against the inside surface of the recess by a pair of spaced O-rings 68, which also serve to form an annular channel 70 between the insert and the inside surface of the recess. An internal T-shaped passageway 72 (shown in dashed lines in FIGS. 4 and 5) in the insert 64 extends from the side surfaces of the insert where it communicates with the annular channel 70 to the end surface of the insert where it opens immediately behind the diaphragm 30.

The diaphragm 30 is normally maintained in a position spaced above the bottom surface 56 of the recess 58 by the force of a compressed coil spring 76 positioned within the ambient air passageway 22. To close the diaphragm valve, pressurized fluid is applied through the high pressure access port 32 in the body portion 42 which communicates directly with the annular channel 70 around the insert 64. The fluid flows from channel 70, through the T-shaped insert passageway 72 and forces the diaphragm 30 against the chamfered end of the passssageway 22, thereby sealing it against the entry of ambient air. Preferrably this pressurized fluid is supplied by a bleed from the pressure side of the vacuum pump and it has been found that about 18 psig is sufficient to keep the diaphragm closed. When this pressure is released, in the event of a pump failure, the spring 76 returns the diaphragm to the normal open position, allowing ambient air to vent through the passageway 22 to the chamber 24. This diaphragm is preferably made of resilient rubber or elastomeric material which can withstand repeated flexing.

In operation, the system to be evacuated is normally connected to the vacuum pump 16 by flexible tubing, which may be received and clamped over the tapered end of the connector 44. The pump is then started, and gas flows from the system or source, through the connector 44, orifice 20 and passageway 14 in the valve housing 12, and into the pump. In this mode of operation the valve means 18 is in the position illustrated in FIG. 4, with the sealing element 28 spaced from the orifice 20, to allow air to be withdrawn from the system being evacuated. An output bleed of the pump is communicated through the high pressure access port 32 pressurizing the diaphragm on the opposite side of the spring 76 and forcing the diaphragm against the end of the passageway 22, thereby preventing entry of ambient air from the vent port 60.

If the pump should stop operating, for whatever reason, high pressure fluid is no longer provided to keep the diaphragm 30 in closed position. The spring 76 forces the diaphragm to an open position, thereby allowing ambient air to vent from the vent port 60 into the passageway 22 and to the chamber 24. The air flows through a side groove 78 in the chamber surface to a position behind the plunger 26 and forces the plunger and sealing element 28 upwardly to close off the orifice 20, thereby preventing back-flow into the evacuated system. In the illustrated embodiment, the sealing element 28 actually seals against the bottom edge of the insert member 44 which is threadedly received in the orifice 20 and extends slightly below the inside surface of the top plate 34. However, this is for purpose of illustration only, and the sealing element 28 would seal the orifice 20 even without the presence of the insert member.

Should the interruption in pumping be caused by mechanical failure requiring repair or replacement of the pump 16, the entire valve assembly 10 or merely the top plate 34 may be removed simply by loosening bolts 80 which hold the assembly together and secured to the pump. The sealing element 28 remains held in tight contact against the orifice 20 by the vacuum in the evacuated system. After the pump has been repaired, or a new pump is provided, the entire valve assembly 10 may be bolted to the new pump, or the top plate 34 and valve means 18 may be reconnected to a new body portion 42 provided on the new pump. In any event, the pump can be relatively easily changed or repaired without necessitating opening the evacuated system to ambient atmosphere.

Upon restarting the vacuum pump 16 after interruption, the valve means 18 does not automatically move to the open position. Before the valve means 18 can move to the open position, the ambient air trapped in the air passageway 22 and in the chamber 24 must be removed. Preferably, the clearance between the surfaces of the piston plunger 26 and chamber 24 is sufficiently small, less than or equal to about 0.002 inches, to restrict the escape of the trapped ambient air therebetween. This results in a delay in the release of the valve means 18, which permits the vacuum pump 16 to draw a substantial vacuum before the valve opens, thereby reducing the brief influx of air or other contaminants into the evacuated system when the valve opens, and thereby minimizing the total back-flow which may occur in the event of interruption in the operation of the vacuum pump 16.

Although the present invention has been described in terms of the preferred embodiment, it is intended that the scope of this application, as set forth in the attached claims, include those equivalent structures, some of which may be immediately apparent upon reading this description, and others of which may be apparent only after some study.

What is claimed is:

1. A back-flow prevention valve assembly adapted for use with a pump for controlling the direction of flow of the fluid being pumped, said valve assembly comprising:

housing means defining a fluid flow passageway therethrough;

valve means carried by said housing means and movable between an open position permitting the flow of fluid through said flow passageway and a closed position blocking said flow passageway;

said housing defining a chamber and said valve means including a plunger portion slidably received within said chamber and spaced a selected distance from the wall of said chamber;

an actuating fluid passageway in said housing adapted at one end for communication with a fluid source having a higher pressure than the fluid being pumped and communicating at the other end with said chamber for applying pressure to said plunger portion to assist in moving said valve means to the closed position; and an actuating fluid control valve carried by said housing and having a fluid pressure access port for communication with high pressure fluid from the pump, said valve being movable by fluid pressure from the pump to close said actuating fluid passageway and movable upon the release of fluid pressure in the event of pump failure to allow actuating fluid into said chamber to force said valve means quickly into said closed position, and wherein said selected distance between said plunger and said cylinder is sufficiently small to restrict the passage of actuating fluid therebetween so as to delay movement of said plunger portion and said valve means to the open position upon restarting of the pump.

2. A valve assembly in accordance with claim 1 wherein said acutating fluid control valve comprises a peripherally sealed diaphragm, one side of which is adjacent said actuating fluid passageway and the other side of which communicates with said fluid pressure access port.

3. A valve assembly in accordance with claim 2 wherein said diaphragm is spring loaded to a normally open position.

4. A valve assembly in accordance with claim 1 wherein said chamber is generally cylindrical and said plunger portion of said valve means comprises a piston-like element received within said chamber.

5. A valve assembly in accordance with claim 4 wherein said fluid flow passageway includes an inlet opening orifice in said housing, and said valve means includes a sealing element adapted to block said orifice when said valve means is in the closed position.

6. A valve assembly in accordance with claim 1 wherein the housing portion defining said fluid passageway upstream of said valve means is removable from the remainder of said housing, and said valve means is removable from said remainder of said housing, thereby permitting said valve means to remain in the closed position to prevent back-flow.

7. A valve assembly in accordance with claim 1 wherein said housing includes a body portion with said fluid passageway extending therethrough, said body portion adapted on one side for connection to a pump and closed on the other side by a cover;

an inlet orifice in said cover adapted to communicate with a fluid source;

said valve means comprising a disc-shaped valve element carried within said hollow body portion and facing said inlet port, with said plunger portion depending from said disc-shaped valve element.

8. A valve assembly in accordance with claim 1 wherein said actuating fluid passageway communicates with the ambient atmosphere.

9. A valve assembly in accordance with claim 1 wherein said selected clearance is preferably less than or equal to about 0.002 inches.

10. A valve assembly in accordance with claim 5 wherein said sealing element and said plunger portion are attached together by a ball and socket joint.

11. A back-flow prevention valve assembly adapted for use with a vacuum pump for preventing back-flow upstream in the event of vacuum pump failure, said valve assembly comprising:

housing means defining a fluid flow passageway therethrough;

valve means carried by said housing means and movable between an open position permitting the flow of fluid through said flow passageway and a closed position blocking said flow passageway, said valve means including a sealing element for sealing said fluid flow passageway and a plunger attached to said sealing element;

said housing defining a chamber slidably receiving said plunger;

an ambient air passageway in said housing adapted at one end for communication with the ambient atmosphere and communicating at the other end with said chamber for applying pressure to said plunger portion to assist in moving said valve means to the closed position; and an ambient air control valve carried by said housing and having a fluid pressure access port for communication with high pressure fluid from the pump, said valve being movable by fluid pressure from the pump to close said ambient air passageway and movable upon the release of fluid pressure in the event of pump failure to allow ambient air into said chamber to force said valve means quickly into said close position, said plunger and said sealing element being attached by a ball and socket joint to provide a more reliable sealing contact between said sealing element and said passageway, and means for retarding the escape of ambient air from said chamber upon restarting of said pump to delay opening of said valve means.

12. A valve assembly in accordance with claim 11 wherein said ambient air control valve comprises a peripherally sealed diaphragm, on side of which is adjacent said ambient air passageway and the other side of which communicates with said fluid pressure access port.

13. A valve assembly in accordance with claim 12 wherein said diaphragm is spring loaded to a normally open position.

14. A valve assembly in accordance with claim 12 wherein said chamber is generally cylindrical and said plunger portion of said valve means comprises a piston-like element received within said chamber.

15. A valve assembly in accordance with claim 14 wherein said fluid flow passageway includes an inlet opening orifice in said housing, and said valve means includes a sealing element adapted to block said orifice when said valve means is in the closed position.

16. A valve assembly in accordance with claim 11 wherein the housing portion defining said fluid passageway upstream of said valve means is removable from the remainder of said housing, and said valve means is removable from said remainder of said housing, thereby permitting said valve means to remain in the closed position to prevent back-flow.

17. A valve assembly in accordance with claim 11 wherein said housing includes a body portion with said fluid passageway extending therethrough, said body portion adapted on one side for connection to a pump and closed on the other side by a cover;

an inlet orifice in said cover adapted to communicate with a fluid source;

said valve means comprising a disc-shaped valve element carried within said hollow body portion and facing said inlet port, with said plunger portion depending from said disc-shaped valve element.

18. A valve assembly in accordance with claim 11 wherein said plunger is spaced from the walls of said chamber a sufficiently small distance to restrict the passage of ambient air from said chamber to delay opening of said valve means upon restarting of the pump after an interruption.

19. A valve assembly in accordance with claim 18 wherein said small distance is preferably less than or equal to about 0.002 inches.

20. A back-flow prevention valve assembly adapted for use with a vacuum pump for preventing back-flow upstream of the pump in the event of pump failure, said valve assembly comprising:

housing means defining a fluid flow passageway, including an inlet orifice, therethrough;

valve means carried by said housing means and comprising a sealing member and a driving member attached together by a ball and socket joint, said sealing member being movable between positions opening and closing said fluid flow passageway;

said housing defining a chamber slidably receiving said driving member;

an ambient air passageway in said housing adapted at one end for communicating with the ambient atmosphere and communicating at the other end with said chamber for applying pressure to said driving portion to move said sealing member to a said closed position; and a normally open diaphragm control valve carried by said housing and having a fluid pressure access port for communication with high pressure fluid from the pump, said diaphragm valve being movable by fluid pressure from the pump to close said ambient air passageway, and movable to a normally open position upon the release of fluid pressure to allow ambient air into said chamber to force said sealing member quickly into said closed position, and wherein, said driving member has a selected clearance from the walls of said chamber sufficiently small to restrict the passage of ambient air therebetween so as to delay movement of said sealing member to said open position upon restarting of vacuum pump after an interruption.

21. A valve assembly in accordance with claim 20 wherein said selected clearance is less than or equal to about 0.002 inches.

22. A valve assembly in accordance with claim 20 wherein said diaphragm valve is carried in a generally cylindrical recess in said housing means, said diaphragm valve being spaced above the bottom surface of said recess, said ambient air passagway communicating through the bottom surface of said recess, and said diaphragm valve being movable to close said ambient air passagway in said bottom wall.

23. A valve assembly in accordance with claim 22 wherein said diaphragm valve is compressively held in said recess by an insert member received within said recess, an annular flow passageway being defined between the sidewall of said recess and said insert member, said high pressure access port communicating with said annular passageway, and said insert having an internal passageway communicating at one end with said annular passageway and at the other end with said diaphragm valve.

24. A back-flow prevention valve assembly adapted for use with a pump for controlling the direction of flow of the fluid being pumped, said valve assembly comprising:

housing means defining a fluid flow passageway therethrough;

valve means carried by said housing means and movable between an open position permitting the flow of fluid through said flow passageway and a close position blocking said flow passageway;

said housing defining a chamber and said valve means including driving means associated with said chamber for moving said valve means;

an actuating fluid passageway in said housing adapted at one end of communication with a fluid source having a higher pressure than the fluid being pumped and communicating at the other end with said chamber for applying pressure to said driving means to move said valve means to the closed position;

an actuating fluid control valve having a fluid pressure access port for communication with high pressure fluid from the pump, said valve being movable by fluid pressure from the pump to close said actuating fluid passageway and movable upon the release of fluid pressure in the event of pump failure to allow actuating fluid into said chamber to force said valve means into said closed position; and restriction means for restricting the passage of actuating fluid from said chamber to delay movement of said valve means to the open position upon restarting of the pump.

25. A valve assembly in accordance with claim 24 wherein said actuating fluid control valve comprises a peripherally sealed diaphragm, one side of which is adjacent said actuating fluid passageway and the other side of which communicates with said fluid pressure access port.

26. A valve assembly in accordance with claim 25 wherein said diaphragm is spring loaded to a normally open position.

27. A valve assembly in accordance with claim 24 wherein said actuating fluid passageway communicates with the ambient atmosphere.

* * * * *